(12) United States Patent
Sandberg et al.

(10) Patent No.: US 10,004,067 B2
(45) Date of Patent: Jun. 19, 2018

(54) TRANSMISSION AND RECEPTION OF REFERENCE SIGNALS IN WIRELESS NETWORKS

(71) Applicant: Telefonaktiebolaget L M Ericsson (publ), Stockholm (SE)

(72) Inventors: Sara Sandberg, Luleå (SE); Robert Baldemair, Solna (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 14/441,950

(22) PCT Filed: Nov. 13, 2012

(86) PCT No.: PCT/SE2012/051243
§ 371 (c)(1),
(2) Date: May 11, 2015

(87) PCT Pub. No.: WO2014/077741
PCT Pub. Date: May 22, 2014

(65) Prior Publication Data
US 2015/0289264 A1    Oct. 8, 2015

(51) Int. Cl.
*H04W 72/04* (2009.01)
*H04L 1/00* (2006.01)
(Continued)

(52) U.S. Cl.
CPC ....... *H04W 72/0446* (2013.01); *H04L 1/0026* (2013.01); *H04L 5/0053* (2013.01);
(Continued)

(58) Field of Classification Search
CPC .......... H04W 72/0446; H04W 52/242; H04W 52/32; H04W 84/042; H04L 1/0026; H04L 5/0053
See application file for complete search history.

(56) References Cited

U.S. PATENT DOCUMENTS

| | | | |
|---|---|---|---|
| 2003/0026295 A1* | 2/2003 | Baum ............... | H04L 27/2662 370/503 |
| 2006/0092875 A1* | 5/2006 | Yang ................. | H04W 52/42 370/329 |

(Continued)

FOREIGN PATENT DOCUMENTS

| | | |
|---|---|---|
| EP | 2 557 834 | 2/2013 |
| EP | 2 573 953 | 3/2013 |

(Continued)

OTHER PUBLICATIONS

PCT International Search Report for International application No. PCT/SE2012/051243, dated Jul. 15, 2013.
(Continued)

*Primary Examiner* — Chirag Shah
*Assistant Examiner* — Joshua Smith
(74) *Attorney, Agent, or Firm* — Patent Portfolio Builders, PLLC (57) ABSTRACT

The enclosed embodiments relate to transmission and reception of reference signals on sub-carriers of a time frequency grid in a wireless network. Resource configuration for transmission of reference signals is obtained by a wireless device. A reference signal received power, RSRP, reference signal, RSRP-RS, is transmitted by the wireless device according to the resource configuration. The RSRP-RS is mapped to every J:th sub-carrier, where J>2. The RSRP-RS is received by a network node.

20 Claims, 5 Drawing Sheets

(51) Int. Cl.
*H04L 5/00* (2006.01)
*H04W 52/24* (2009.01)
*H04W 52/32* (2009.01)
*H04W 84/04* (2009.01)

(52) U.S. Cl.
CPC ......... *H04W 52/242* (2013.01); *H04W 52/32* (2013.01); *H04W 84/042* (2013.01)

(56) References Cited

U.S. PATENT DOCUMENTS

| | | | | |
|---|---|---|---|---|
| 2008/0075191 | A1* | 3/2008 | Haartsen | H04L 27/2614 375/285 |
| 2008/0205351 | A1* | 8/2008 | Lindoff | H04L 27/0008 370/336 |
| 2008/0279170 | A1* | 11/2008 | Malladi | H04L 5/0017 370/343 |
| 2009/0310589 | A1* | 12/2009 | Nangia | H04L 5/0007 370/344 |
| 2010/0137017 | A1* | 6/2010 | Lin | H04W 52/08 455/522 |
| 2010/0246705 | A1* | 9/2010 | Shin | H04W 52/146 375/267 |
| 2011/0171992 | A1* | 7/2011 | Seo | H04W 52/10 455/522 |
| 2011/0188472 | A1* | 8/2011 | Jeon | H04W 36/0083 370/331 |
| 2012/0106372 | A1* | 5/2012 | Gaal | H04L 1/0006 370/252 |
| 2012/0122472 | A1* | 5/2012 | Krishnamurthy | H04L 5/0053 455/456.1 |
| 2012/0282916 | A1* | 11/2012 | Futaki | H04W 24/10 455/422.1 |
| 2013/0044665 | A1* | 2/2013 | Ng | H04W 52/242 370/311 |
| 2013/0077599 | A1* | 3/2013 | Dimou | H04W 36/22 370/331 |
| 2014/0094169 | A1* | 4/2014 | Takano | H04W 48/16 455/434 |
| 2014/0256336 | A1* | 9/2014 | Manssour | H04W 72/1226 455/450 |
| 2015/0304960 | A1* | 10/2015 | Yang | H04L 1/0041 370/252 |

FOREIGN PATENT DOCUMENTS

| | | |
|---|---|---|
| WO | WO 2011/038252 | 3/2011 |
| WO | WO 2011/126025 | 10/2011 |
| WO | WO 2011/145886 | 11/2011 |
| WO | WO 2012/094608 | 7/2012 |

OTHER PUBLICATIONS

PCT Written Opinion of the International Searching Authority for International application No. PCT/SE2012/051243, dated Jul. 15, 2013.

* cited by examiner

TRANSMISSION AND RECEPTION OF REFERENCE SIGNALS IN WIRELESS NETWORKS

PRIORITY

This nonprovisional application is a U.S. National Stage Filing under 35 U.S.C. § 371 of International Patent Application Serial No. PCT/SE2012/051243, filed Nov. 13, 2012 and entitled "Transmission and Reception of Reference Signals in Wireless Networks."

TECHNICAL FIELD

Embodiments presented herein relate to wireless networks, and particularly to transmission and reception of reference signals in wireless networks.

BACKGROUND

In wireless communication networks, there is always a challenge to obtain good performance and capacity for a given communications protocol, its parameters and the physical environment in which the wireless communication network is deployed.

According to the LTE (Long Term Evolution) telecommunications standard cell-specific reference signals (CRS) are transmitted in all downlink subframes. In addition to assisting downlink channel estimation, the CRS are also used for mobility measurements performed by the wireless devices (in LTE also known as user equipment, UE). The CRS are generally intended for use by all the UEs in the coverage area of the network node transmitting the downlink signals. As of LTE Release-10, specific reference signals are provided for measuring the channel for the purpose of generating channel state information (CSI) feedback from the UE. The latter reference signals are referred to as CSI-RS. CSI-RS are not transmitted in every subframe, and they are generally sparser in time and frequency than reference signals used for demodulation. CSI-RS transmissions may take place every fifth, tenth, twentieth, fortieth, or eightieth subframe, as determined by a periodicity parameter and a subframe offset, each of which are configured by Radio Resource Control (RRC) signalling.

A UE operating in a connected mode can be requested by the network node (base station) to perform channel state information (CSI) reporting. This reporting may comprise, for example, reporting a suitable rank indicator (RI) and one or more precoding matrix indices (PMIs), given the observed channel conditions, as well as a channel quality indicator (CQI). Other types of CSI are also conceivable, including explicit channel feedback and interference covariance feedback. The CSI feedback assists the network node in scheduling, including deciding which subframe and resource blocks to use for the transmission, as well as deciding which transmission scheme and/or precoder should be used. The CSI feedback also provides information that can be used to determine a proper user bit-rate for the transmission, i.e., for link adaptation.

In order to support mobility, a wireless device needs to continuously search for, synchronize to, and estimate the reception quality of both its serving cell and neighbour cells (i.e. cells neighbouring the serving cell). The reception quality of the neighbour cells, in relation to the reception quality of the current cell (i.e. the serving cell), is then evaluated in order to determine whether a handover, for UEs in the connected mode, or cell re-selection, for UEs in an idle mode, should be carried out. For wireless devices in connected mode, the handover decision is taken by the network, based on measurement reports provided by the wireless devices. Examples of such reports are reference signal received power (RSRP) and reference signal received quality (RSRQ).

Typically, RSRP measurements are accomplished through wireless device measurements on downlink reference signals (RS) and feedback of such measurements to the network. However, there may be a number of issues associated with the downlink based approach. For example, the network may need to wait for an updated measurement from the wireless device, which typically is performed sparsely in time. For example, in case of dense deployments and/or intense traffic, the uplink (UL) signalling in the network due to downlink measurements may be undesirably high. For example, in case of dense deployments, it may be challenging for the network to identify which RS a wireless device should measure on. For example, some nodes associated with low transmission power may not be able to reach a wireless device for downlink measurements, even though such network nodes are of potential interest as reception points. The same issue occurs for network nodes that are not provided with a transmitter on the carrier of interest. In general terms, a carrier signal as herein defined is the sum of a number of orthogonal sub-carriers, where baseband data on each sub-carrier is independently modulated. For example, for certain deployments, cell specific reference signals suitable for RSRP measurements may not be available, at least for certain carriers optimized for data transmission.

Uplink RSRP measurements in principle may be possible in LTE, e.g., based on sounding reference signals (SRS). However, SRS were originally designed with the aim of link adaptation and may not necessarily be optimized for long range RSRP measurements. In particular, SRS are designed for channel estimation (i.e., for estimating the time or frequency domain response of the channel) while in case of RSRP measurements only the received power is of interest. Furthermore, in order to allow for link adaptation, the transmission power for SRS is linked to the transmission power on the physical uplink shared channel (PUSCH) by a configurable offset (with the exception of power limited transmission). To allow for RSRP measurements to both the serving cell and neighbour cells, a large number of wireless devices may require multiplexed transmission of the SRS. However, the multiplexing capacity for SRS, i.e. the number of SRS that are orthogonal to each other and may be transmitted in parallel in the same subframe, may not be sufficient for supporting uplink measurements from a large number of wireless devices.

Hence, there is still a need for an improved transmission and reception of reference signals.

SUMMARY

An object of embodiments herein is to provide improved transmission and reception of reference signals.

Uplink measurements for the purpose of e.g., downlink or uplink transceiver point selection, mobility, cell selection etc, are possible according to the LTE standard. However, the interference levels and path loss levels involved in such measurements make the current uplink signals in LTE unsuitable for uplink measurements for the above purposes in several application scenarios.

A particular object is therefore to provide an uplink reference signal type specifically designed for uplink measurements.

According to a first aspect there is presented a method of transmitting reference signals on sub-carriers of a time frequency grid in a wireless network. The method is performed by a wireless device. The method comprises obtaining resource configuration for transmission of reference signals. The method further comprises transmitting a reference signal received power, RSRP, reference signal, RSRP-RS, according to said resource configuration. The RSRP-RS is mapped to every J:th sub-carrier, where J>2.

According to a second aspect there is presented a method of receiving reference signals on sub-carriers of a time frequency grid in a wireless network. The method is performed by a network node. The method comprises receiving a reference signal received power, RSRP, reference signal, RSRP-RS, for uplink measurements from a wireless device. The RSRP-RS is mapped to every J:th sub-carrier, where J>2.

Advantageously this enables uplink measurements to be performed by the network node with an SRS-like reference signal that can reach transceiver points further away than SRS. The larger coverage is achieved through a large comb (i.e., J>2), since this allows the power to be concentrated (thereby boosted) only to every J:th sub-carrier, as well as improved power control that may take the pathloss to several nearby transceiver points into account.

With the large comb, the multiplexing capacity of the new reference signal type is also large, even without multiplexing of wireless devices through different cyclic shifts. Since multiplexing through cyclic shifts requires that all reference signals span the same frequency band, the coordination of wireless devices is less complex for the RSRP-RS if multiplexing through different cyclic shifts is not employed, which thus may be particularly suitable for inter-cell coordination. However, depending on the needs of multiplexing capacity etc. a combination of frequency division multiplexing using the different combs and multiplexing through different cyclic shifts may be used.

The RSRP-RS may be transmitted when needed, periodically or in an aperiodic manner and with a small signalling overhead, thereby enabling flexibility of the transmission of the RSRP-RS.

According to a third aspect there is presented a wireless device for transmission of reference signals on sub-carriers of a time frequency grid in a wireless network. The wireless device comprises a receiver arranged to obtain resource configuration for transmission of reference signals. The wireless device further comprises a transmitter arranged to transmit a reference signal received power, RSRP, reference signal, RSRP-RS, according to said resource configuration. The RSRP-RS is mapped to every J:th sub-carrier, where J>2.

According to a fourth aspect there is presented a network node for reception of reference signals on sub-carriers of a time frequency grid in a wireless network. The network node comprises a receiver arranged to receive a reference signal received power, RSRP, reference signal, RSRP-RS, for uplink measurements from a wireless device. The RSRP-RS is mapped to every J:th sub-carrier, where J>2.

According to a fifth aspect there is presented a wireless network for transmission and reception of reference signals on sub-carriers of a time frequency grid in the wireless network. The wireless network comprises at least one wireless device according to the third aspect. The wireless network further comprises at least one network node according to the fourth aspect.

According to a sixth aspect there is presented a computer program for transmission of reference signals on sub-carriers of a time frequency grid in a wireless network. The computer program comprises computer program code which, when run on a wireless device, causes the wireless device to perform a method according to the first aspect.

According to a seventh aspect there is presented a computer program for reception of reference signals on sub-carriers of a time frequency grid in a wireless network. The computer program comprises computer program code which, when run on a network node, causes the network node to perform a method according to the second aspect.

According to an eight aspect there is presented a computer program product comprising a computer program according to the sixth and/or seventh aspect and a computer readable means on which the computer program is stored.

It is to be noted that any feature of the first, second, third, fourth, fifth, sixth, seventh, and eighth aspects may be applied to any other aspect, wherever appropriate. Likewise, any advantage of the first aspect may equally apply to the second, third, fourth, fifth, sixth, seventh and/or eight aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The present disclosure is now described, by way of example, with reference to the accompanying drawings, in which.

DETAILED DESCRIPTION

The present disclosure will now be described more fully hereinafter with reference to the accompanying drawings, in which certain embodiments are shown. The present disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the description.

Figure 1:
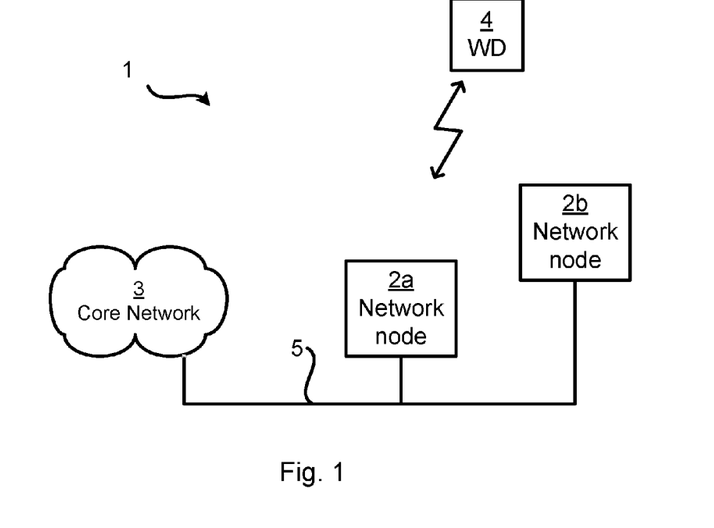
FIG. 1 is a schematic diagram illustrating a wireless network where embodiments presented herein may be applied.

FIG. 1 is a schematic diagram illustrating a wireless network 1 where embodiments presented herein can be applied. The wireless network 1 comprises a number of network nodes 2a, 2b and a wireless device (WD) 4. The wireless device 4 is enabled to access services provided by the core network 3 by being operatively connected to one of the network nodes 2a, 2b. In turn the network nodes 2a, 2b are operatively connected to the core network 3 via an interface 5. As used herein, a transceiver point corresponds to a set of antennas covering essentially the same geographical area in a similar manner. One transmitting/receiving network node 2a, 2b, such as an LTE evolved node B, eNB, may be arranged to control one or several transceiver points. Thus, a transceiver point may correspond to one of the sectors at a network node site, but it may also correspond to a site having one or more antennas all intending to cover a similar geographical area. Often, different transceiver points represent different sites. Antennas correspond to different transceiver points when they are sufficiently geographically separated and/or have antenna diagrams pointing in sufficiently different directions. Techniques for coordinated multipoint (CoMP) entail introducing dependencies in the scheduling or transmission/reception among different transceiver points, in contrast to conventional cellular systems where a transceiver point is operated more or less independently from the other transceiver points, from a scheduling point of view.

When downlink CoMP is applied, the network needs to dynamically or semi-statically determine which transceiver points are to serve each wireless device 4 in the downlink. Additionally, the network needs to determine a set of transceiver points for which receiving feedback from the wireless device 4 would be beneficial. Such a set of transceiver points for feedback reception is typically selected in a semi-static fashion (i.e., they are typically constant for several subframes) and the corresponding feedback may be employed for scheduling, link adaptation and dynamic selection of the transceiver points within the set of transceiver points for which feedback is available. The set of suitable transceiver points for a wireless device 4 typically changes dynamically, e.g. as the wireless device 4 moves (in geographic sense) through the network. The network therefore needs to select, and continuously update, a set of candidate transceiver points for the wireless device 4. The wireless device 4 then sends more detailed feedback, e.g. precoding information, for the transceiver points in the candidate set, thereby enabling the network 1 to select the best downlink transceiver points. The techniques mentioned above will be collectively referred to as "transceiver point selection" in the following. The transceiver points in the candidate set may be determined in a wireless device centric manner, wherein the wireless device 4 performs measurements on downlink signals (e.g. CSI-RS) and reports the results to the network.

As noted above, sounding reference signals are transmitted on the uplink to allow for the network node to estimate the uplink channel state at different frequencies and time instances as compared to PUSCH transmissions. The channel-state estimates may then, for example, be used by the network scheduler to assign resource blocks of instantaneously good quality for uplink PUSCH transmission (uplink channel-dependent scheduling), as well as to select different transmission parameters such as the instantaneous data rate and different parameters related to uplink multi-antenna transmission. As mentioned above, SRS transmission may also be used for uplink timing estimation as well as to estimate downlink channel conditions assuming downlink/uplink channel reciprocity. Thus, an SRS is not necessarily transmitted together with any physical channel and if transmitted together with, for example, PUSCH, the SRS may cover a different, typically larger, frequency span. Possibly, SRS may also be employed for mobility measurements (e.g., cell and transmission/reception points association) as well as uplink received signal strength measurements. Such measurements may be employed, e.g., for adjusting the power transmitted by the corresponding wireless device 4.

In general terms, there are two types of SRS transmission defined for the LTE uplink: periodic SRS transmission, which has been available from the first release of LTE (release 8); and aperiodic SRS transmission, introduced in LTE release 10.

Periodic SRS transmission (also known as Type 0 SRS) from a wireless device 4 occurs at regular time intervals, from as often as once every 2 ms (every second subframe) to as infrequently as once every 160 ms (every 16th frame). When SRS is transmitted in a subframe, it occupies the last symbol of the subframe. As an alternative, in the case of time-division duplexing (TDD) operation, SRS can also be transmitted within the uplink pilot time slot (UpPTS).

In the frequency domain, SRS transmissions should cover the frequency band that is of interest for the scheduler. This can be achieved in two ways:

By means of a sufficiently wideband SRS transmission that allows for sounding of the entire frequency band of interest with a single SRS transmission.

By means of more narrowband SRS transmission, combined with hopping in the frequency domain, in such a way that a sequence of SRS transmissions jointly covers the frequency band of interest.

The structure for sounding reference signals (SRS) is similar to that of uplink demodulation reference signals. More specifically, a sounding reference signal is also defined as a frequency-domain reference-signal sequence derived as a cyclic extension of prime-length Zadoff-Chu sequences. However, in the case of SRS, the reference-signal sequence is mapped to every second subcarrier, creating a "comb"-like spectrum. Taking into account that the bandwidth of the SRS transmission is always a multiple of four resource blocks, the lengths of the reference-signal sequences for SRS are thus always a multiple of 24. The reference-signal sequence to use for SRS transmission within the cell is taken from the same sequence group as the demodulation reference signals used for channel estimation for the physical uplink control channel (PUCCH). Similar to demodulation reference signals, different phase rotations (also, for SRS, typically referred to as "cyclic shifts") can be used to generate different SRS that are orthogonal to each other.

By assigning different phase rotations to different wireless devices 4, multiple SRS can thus be transmitted in parallel in the same subframe. However, it is then required that the reference signals span the same frequency band.

Another way to allow for SRS to be simultaneously transmitted from different wireless devices 4 is to rely on the fact that each SRS only occupies every second subcarrier. Thus, SRS transmissions from two wireless devices 4 can be frequency multiplexed by assigning them to different frequency shifts or "combs". In contrast to the multiplexing of SRS transmission by means of different "cyclic shifts", frequency multiplexing of SRS transmissions does not require the transmissions to cover identical frequency bands.

To summarize, the following set of parameters defines the characteristics of an SRS transmission:

SRS transmission bandwidth—that is, the bandwidth covered by a single SRS transmission.

Hopping bandwidth—that is, the frequency band over which the SRS transmission is frequency hopping.

Frequency-domain position—that is, the starting point of the SRS transmission in the frequency domain.

Transmission comb.

Phase rotation (or equivalently cyclic shift) of the reference-signal sequence.

SRS transmission time-domain period (from 2 to 160 ms) and subframe offset.

A wireless device 4 that is to transmit SRS is configured with these parameters by means of higher layer (RRC) signalling from a network node 2a, 2b. In addition, all wireless devices 4 within a cell should be informed in what subframes SRS may be transmitted within the cell as, within these subframes, the "SRS symbol" should not be used for physical uplink shared channel (PUSCH) transmission.

In contrast to periodic SRS, aperiodic SRS (also known as Type 1 SRS) are one-shot transmissions, triggered by signalling on the physical downlink control channel (PDCCH) as part of the scheduling grant. The frequency-domain structure of an aperiodic SRS transmission is identical to that of periodic SRS. Also, in the same way as for periodic SRS transmission, aperiodic SRS are transmitted within the last symbol of a subframe.

The setting of the transmit power $P_{SRS}$ of the wireless device 4 for the Sounding Reference Symbol transmitted on subframe i for serving cell c is defined by $$P_{SRS,c}(i) = \min\left\{\begin{array}{l} P_{CMAX,c}(i), \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{array}\right\}$$

[dBm]

where $P_{CMAX,c}(i)$ is the configured transmit power of the wireless device 4 in subframe i for serving cell c. $P_{SRS\_OFFSET,c}(m)$ is a parameter semi-statically configured by higher layers for m=0 and m=1 for serving cell c. For SRS transmission given trigger type 0 then m=0 and for SRS transmission given trigger type 1 then m=1. $M_{SRS,c}$ is the bandwidth of the SRS transmission for serving cell c expressed in number of resource blocks. $f_c(i)$ is the current PUSCH power control adjustment state for serving cell c in subframe i, i.e., the closed loop power control (PC) correction for PUSCH. The nominal transmit power $P_{O\_PUSCH,c}(j)$ and the pathloss compensation factor $\alpha_c(j)$ are parameters defined by higher layer signalling. These parameters are further explained in 3GPP TS 36.213, v10.4.0, section 5.1.1.1.

$PL_c$ is the downlink pathloss estimate calculated in the wireless device 4 for serving cell c in dB. The pathloss estimate is calculated by the wireless device 4 as the difference between the received power for a certain reference signal and its nominal transmit power, and it is possibly averaged in time.

If the total transmit power of the wireless device 4 for the SRS would exceed $\hat{P}_{CMAX}(i)$, the wireless device 4 scales $\hat{P}_{SRS,c}(i)$ for the serving cell c in subframe i such that the condition $$\sum_c w(i) \cdot \hat{P}_{SRS,c}(i) \le \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of the maximum transmit power $P_{CMAX}$ in subframe i and w(i) is a scaling factor of $\hat{P}_{SRS,c}(i)$ for serving cell c where 0<w(i)≤1. The w(i) values are the same across the serving cells.

Herein is disclosed an uplink reference signal type specifically designed for uplink measurements. The disclosed reference signal type is similar to SRS, but with some differences that make the reference signal possible to be received at several different transceiver points.

One difference is that the comb factor is larger than two and thus enables frequency division multiplexing of more than two wireless devices 4. The proposed reference signal type is transmitted over a number of different subcarriers and frequency-domain averaging of the received power is possible. With a large comb, each wireless device 4 transmits the new reference signal only on a few subcarriers, which means that the maximum transmit power per subcarrier is relatively high, thereby enabling RSRP measurements also at network nodes further away. The RSRP-RS is typically transmitted over the whole frequency band where path loss estimates are of interest. But in general, different bandwidths of the RSRP-RS transmission may be available.

Another difference is that the power control of the disclosed reference signal type is adjusted to make sure that the signal may be received by multiple transceiver points.

The embodiments disclosed herein thus relate to improved transmission and reception of reference signals in the wireless network 1. In order to obtain improved transmission and reception of reference signals in the wireless network 1 there is provided a wireless device 4, a method performed in the wireless device 4, and a computer program 19a comprising code, for example in the form of a computer program product 18, that when run on the wireless device 4, causes the wireless device 4 to perform the method. There is also provided a network node 2, a method performed in the network node 2, and a computer program 19b comprising code, for example in the form of a computer program product 18, that when run on the network node 2, causes the network node 2 to perform the method.

Figure 2:
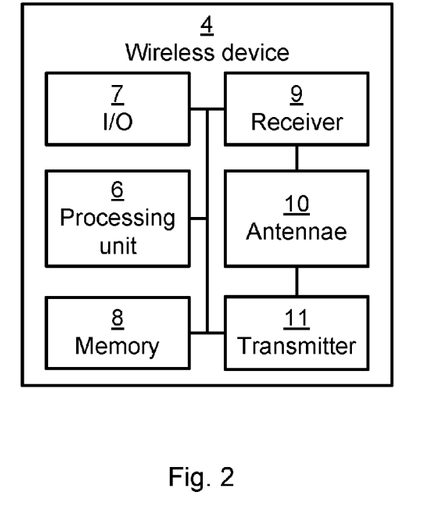
FIG. 2 is a schematic diagram showing functional modules of a wireless device.

FIG. 2 schematically illustrates, in terms of a number of functional modules, the components of a wireless device 4. A processing unit 6 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 18 (as in FIG. 4), e.g. in the form of a memory 8. Thus the processing unit 6 is thereby arranged to execute methods related to the wireless device 4 as herein disclosed. The memory 8 may also comprise persistent storage, which, for example, can be any single one or combination of magnetic memory, optical memory, solid state memory or even remotely mounted memory. The wireless device 4 may further comprise an input/output (I/O) interface 7 for receiving and providing information to a user interface. The wireless device 4 also comprises one or more transmitters 11 and receivers 9, comprising analogue and digital components and a suitable number of antennae 10 for radio communication with the network node 2a, 2b. The processing unit 6 controls the general operation of the wireless device 4, e.g. by sending control signals to the transmitter 11 and/or receiver 9 and receiving reports from the transmitter 11 and/or receiver 9 of its operation. Other components, as well as the related functionality, of the wireless device 4 are omitted in order not to obscure the concepts presented herein.

Figure 3:
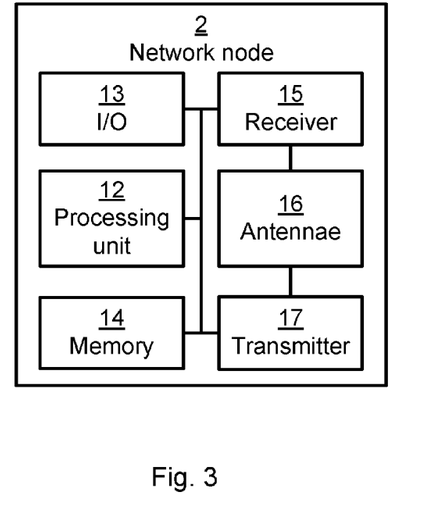
FIG. 3 is a schematic diagram showing functional modules of a network node.

FIG. 3 schematically illustrates, in terms of a number of functional modules, the components of a network node 2. A processing unit 12 is provided using any combination of one or more of a suitable central processing unit (CPU), multi-processor, microcontroller, digital signal processor (DSP), application specific integrated circuit (ASIC), field programmable gate arrays (FPGA) etc., capable of executing software instructions stored in a computer program product 18 (as in FIG. 4), e.g. in the form of a memory 14. Thus the processing unit 12 is thereby arranged to execute methods related to the network node 2 as herein disclosed. The memory 14 may also comprise persistent storage, which, for example, can be any single one or combination of magnetic memory, optical memory, solid state memory or even remotely mounted memory. The network node 2 may further comprise an input/output (I/O) interface 13 for receiving and providing information to the core network 5. The network node 2 also comprises one or more transmitters 17 and receivers 15, comprising analogue and digital components and a suitable number of antennae 16 for radio communication with the wireless device 4. The processing unit 12 controls the general operation of the network node 2, e.g. by sending control signals to the transmitter 17 and/or receiver 15 and receiving reports from the transmitter 17 and/or receiver 15 of its operation. Other components, as well as the related functionality, of the network node 2 are omitted in order not to obscure the concepts presented herein.

Figure 4:
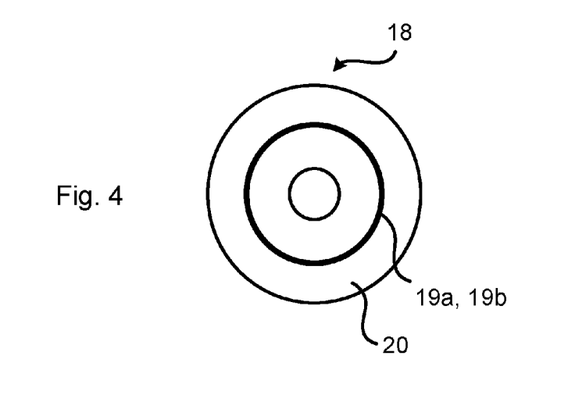
FIG. 4 shows one example of a computer program product comprising computer readable means.
Figure 5:
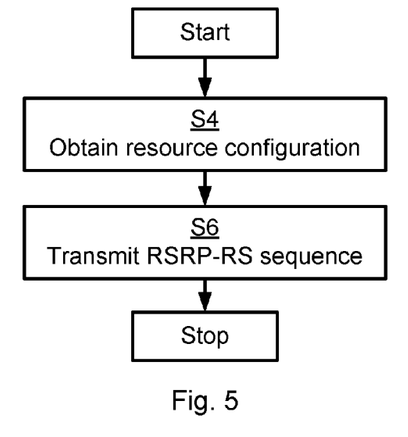
FIGS. 5-8 are flowcharts of methods according to embodiments.
Figure 6:
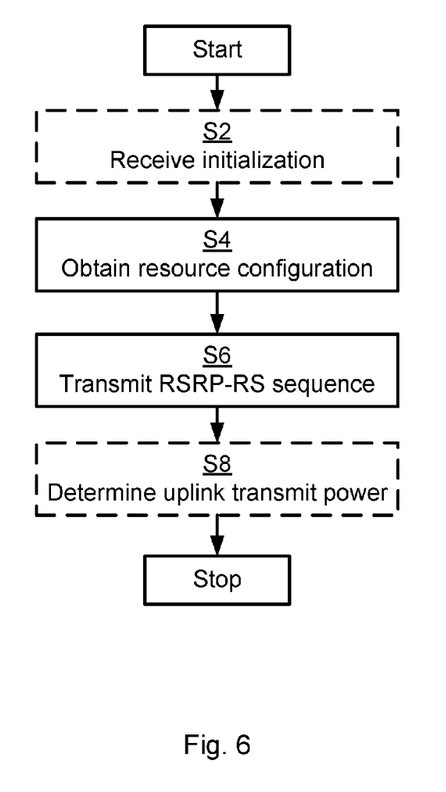
Figure 7:
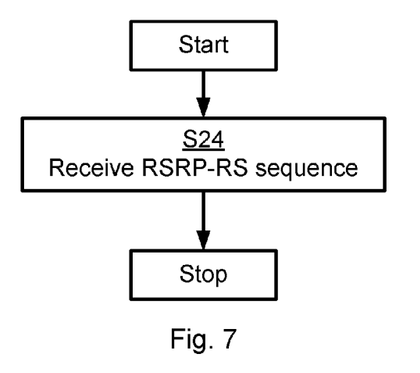
Figure 8:
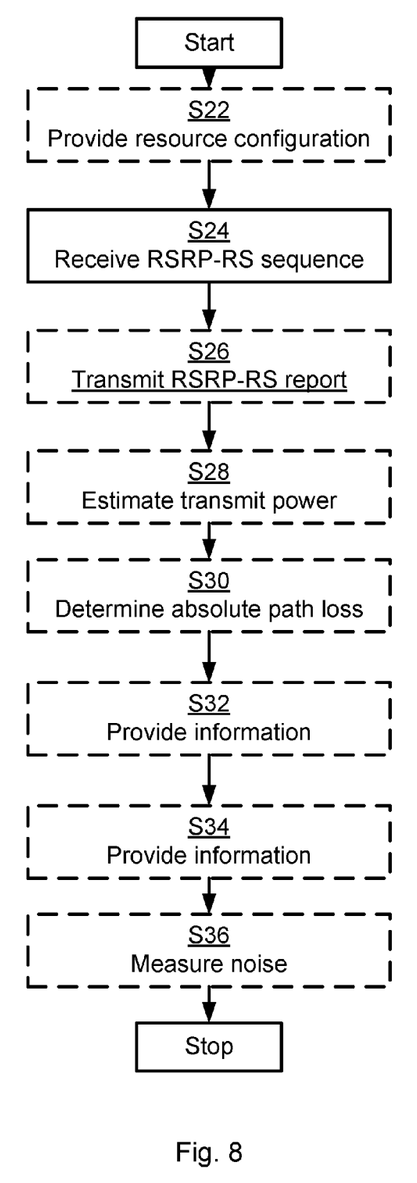

FIGS. 5 and 6 are flow charts illustrating embodiments of methods of transmitting reference signals as performed in the wireless device 4. FIGS. 7 and 8 are flow charts illustrating embodiments of methods of receiving reference signals as performed in the network node 2. The methods are advantageously provided as computer programs 19a, 19b. FIG. 4 shows one example of a computer program product 18 comprising computer readable means 20. On this computer readable means 20, a computer program 19a can be stored, which computer program 19a can cause the wireless device 4 to execute methods according to embodiments described herein. The computer readable means 20 may additionally or alternatively store a computer program 19b which can cause the network node 2 to execute methods according to embodiments described herein.

In the example of FIG. 4, the computer program product 18 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer programs 19a, 19b are here schematically shown as a track on the depicted optical disk, the computer programs 19a, 19b can be stored in any way which is suitable for the computer program product 18.

Returning now to FIG. 1, uplink measurements may be exploited in a wireless network 1 for multiple purposes including e.g. selection of preferred or potential transceiver points for CoMP operations, both in the uplink (UL) and the downlink (DL), as well as support to mobility and handover procedures.

In case of CoMP, UL measurements would allow the wireless network 1 to discover at least the relative path loss difference associated with different transceiver points, such as the network node 2a and the network node 2b. According to one embodiment, the wireless network 1 is even able to obtain an estimate of the absolute path loss associated to such transceiver points. The path loss indications may be exploited, e.g., for assisting the wireless network 1 in configuring the wireless device 4 to measure on a specific RS for feedback purposes (e.g., CSI-RS), where such RS are transmitted by transceiver points with reasonably low path loss to the wireless device 4 and they are therefore potentially suitable for transmission in a CoMP context. Similarly, UL measurements may be used for selecting potential reception transceiver points for UL CoMP. Such selections may be periodically updated depending on the speed of movement of the wireless device 4. In case of mobility, UL measurements may be exploited for gathering information about the position of the wireless device 4 in the wireless network 1 without requiring signal strength (RSRP) measurements from the wireless device 4.

A method of transmitting reference signals on sub-carriers of a time frequency grid in the wireless network 1 comprises in a step S4 obtaining resource configuration for transmission of reference signals. The resource configuration is obtained by the receiver 9 of the wireless device 4.

The transmitter 11 of the wireless device 4 is arranged to, in a step S6, transmit a reference signal received power, RSRP, reference signal, RSRP-RS, according to the resource configuration, wherein the RSRP-RS is mapped to every J:th sub-carrier, where J>2. In general terms the RSRP-RS may be defined as a reference signal transmitted by a wireless device 4 for reception at a transceiver point which enables the transceiver point to measure or determine received power. Instead of using RSRP, also reference signal received quality (RSRQ) measurements could be used. Hence, the transmitter 11 of the wireless device 4 may be arranged to transmit a reference signal received quality, RSRQ, reference signal, RSRQ-RS, according to the resource configuration, wherein the RSRQ-RS is mapped to every J:th sub-carrier, where J>2. Hence, hereinafter the term RSRP-RS may be replaced by RSRQ-RS.

In general terms, the RSRP-RS may be transmitted in a trigger-based fashion by each wireless device 4, at configured time instances (subframes). If the RSRP-RS is to be transmitted in a specific subframe, it is according to embodiments transmitted in the last symbol of the subframe. Other signals or channels scheduled by the wireless device 4 in the same subframe as the RSRP-RS may be rate matched, punctured or cancelled. Thereby interference on RSRP-RS in the last symbol of the subframe may be avoided, or at least mitigated. For example, for PUSCH the last symbol is not used. For PUCCH carrying HARQ ACK/NACK typically a short PUCCH format is designed not using the last SC-FDMA symbol. If such a format does not exist the RSRP-RS should be dropped.

In general terms the RSRP-RS may be transmitted when needed, periodically or in an aperiodic manner and with a small signalling overhead. According to an embodiment the resource configuration thus determines the RSRP-RS to be transmitted periodically, aperiodically, or upon request from a network node 2a, 2b.

Differently from SRS, RSRP-RS is provided with a comb factor J larger than 2. According to embodiments J is significantly larger than 2. In particular, the RSRP-RS is not dependent on a design requirement that the comb separation in frequency domain should be smaller than the channel's coherence bandwidth. The coherence bandwidth is defined as the approximate maximum bandwidth or frequency interval over which two frequencies of a signal are likely to experience comparable or correlated amplitude fading. Multiplexing of wireless devices 4 through the use of different cyclic shifts that result in reference signals being orthogonal, as used for SRS, requires the reference signals to span the same frequency band. This requirement does not exist for FDM multiplexing, making such a solution more flexible and requiring less coordination among wireless devices 4. RSRP-RS with a large comb enables FDM multiplexing of many wireless devices 4. Since RSRP-RS is transmitted over several different subcarriers, frequency-domain averaging of the received power is possible.

Figure 10:
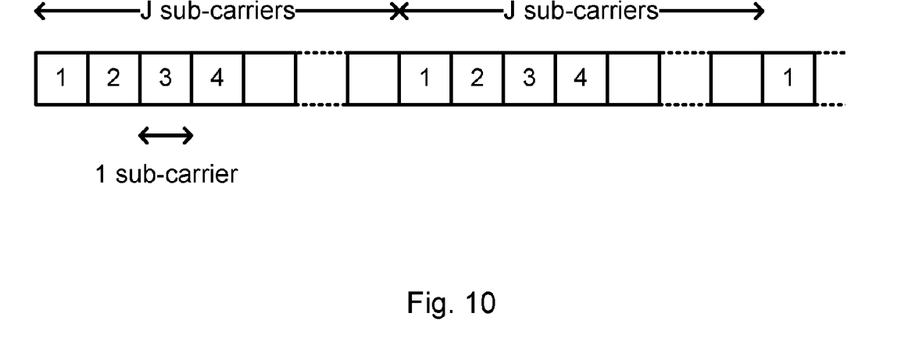
FIG. 10 schematically illustrates frequency division multiplexing of RSRP-RS signalling.

Given the large comb factor, potentially many sub-carriers are empty in the last symbol of subframes used for RSRP-RS transmissions (this occurs if the comb multiplexing capacity is not fully used). That is, according to embodiments a plurality of sub-carriers are not used for transmitting the RSRP-RS. Such empty sub-carriers can be exploited in the network node 2a, 2b for noise measurements (see below). If cells are not coordinated then sub-carriers which are empty in one cell may not be empty in another cell. In such a case the measurement would return noise plus interference. In an uncoordinated network it may even be so that cells are not time aligned, i.e. RSRP-RS in one cell overlap with other channels/signals in another cell. Nevertheless, the power difference between subcarriers which contain RSRP-RS of the target wireless device 4 and sub-carriers that do not contain RSRP-RS from the target wireless device 4 should anyway be an indication of the power contained in RSRP-RS. An example of the frequency division multiplexing of RSRP-RS is shown in FIG. 10. In particular, FIG. 10 illustrates an example of the frequency division multiplexing of RSRP-RS. Five wireless devices 4 in one cell use five consecutive combs and the remaining empty combs (J-5) may thus be used for noise measurements.

Additionally, with a large comb, each wireless device 4 may transmit the RSRP-RS only on a few subcarriers, which means that the maximum transmit power per subcarrier is relatively high, thereby enabling RSRP measurements also at network nodes 2b further away.

If the comb multiplexing capacity is not fully used, comb coordination, that is, using different combs for transmission of RSRP-RS from wireless devices 4 in neighbouring cells, will reduce the inter-cell interference between the RSRP-RS. Particularly, according to embodiments the sub-carriers selected for transmission of the RSRP-RS are assigned according to a pseudo-random sequence. According to embodiments the receiver 9 of the wireless device 4 is therefore arranged to, in a step S2, receive initialization of the pseudo-random sequence from the network node 2a, 2b. The pseudo-random sequence may be a function of time and may relate to a shift of a starting carrier of the J:th sub-carrier. The combs used for RSRP-RS transmissions may also be chosen in a structured way, where each cell is assigned a starting subcarrier of the comb and the FDM multiplexing assigns comb subcarriers to the different wireless devices 4 in a consecutive manner.

Figure 9:
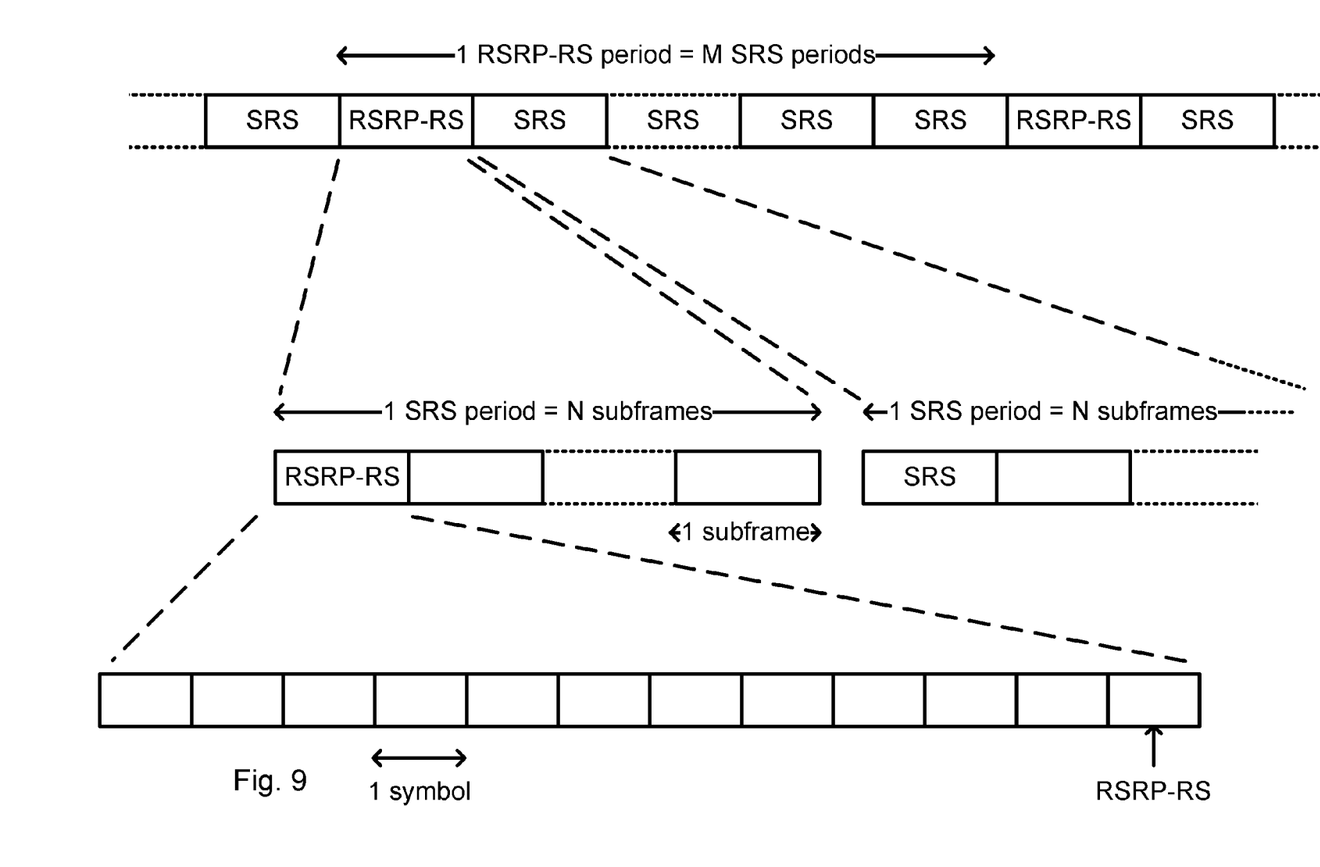
FIG. 9 schematically illustrates SRS and RSRP-RS transmission.

The grid at which the RSRP-RS and SRS signals can occur may be semi-statically configured. That is, according to embodiments the resource configuration relates to a semi-static configuration of the grid on which the RSRP-RS is to occur. The configuration may be determined so as to minimize interference between SRS transmissions. However, even if a prioritization rule would be specified, collisions between RSRP-RS and SRS and/or RSRP-RS transmitted by other wireless devices 4 may occur. Since SRS and RSRP-RS typically not are orthogonal such collisions could be minimized by proper network configuration of the resources for SRS and RSRP-RS. An example of the RSRP-RS transmission is shown in FIG. 9. FIG. 9 illustrates an embodiment of how transmission of SRS and RSRP-RS can be multiplexed to avoid collisions. According to the illustrative example of FIG. 9, RSRP-RS is transmitted less often than SRS. As illustrated in FIG. 9, in every block of M SRS transmissions, one SRS is according to an embodiment replaced by one RSRP-RS transmission. Thus: one RSRP-RS period=M SRS periods=M×N subframes.

If SRS and RSRP-RS transmission should be coordinated across cells, signalling between network nodes 2a, 2b generally needs to be defined enabling this information exchange. Such signalling could be done by defining new messages for the X2 interface.

Additionally, if the RSRP-RS collides with PUCCH only carrying CSI and if a short PUCCH format exists and is configured, PUCCH would not use the last SC-FDMA symbol in colliding subframes and RSRP-RS is transmitted. If such a short format does not exist the RSRP-RS would be dropped.

RSRP-RS should be possible to be received by multiple transceiver points To make this possible, a large path loss between a wireless device 4 and a network node 2 may be compensated for by a high transmission power. The path loss compensation must in such situations consider path loss to multiple transceiver points. In other words, the path loss compensation can not take as input only the path loss to one particular transceiver point. According to an embodiment, in a step S8 an uplink transmit power for the RSRP-RS is determined by the processing unit 6 of the wireless device 4. The uplink transmit power may be based on path loss estimates, such as path loss estimates between the wireless device 4 and at least two receiver points. According to embodiments the uplink transmit power is based on path loss estimates, such as downlink path loss estimates determined by the wireless device 4 for at least two transceiver points or uplink absolute path loss estimates performed by the network node 2, see step S30 below. More particularly, the setting of the transmit power $P_{RSRP-RS}$ of the wireless device 4 for the RSRP-RS transmitted on subframe i for serving cell c is defined by $$P_{RSRP-RS,c}(i) = \min\left\{\begin{array}{l} P_{CMAX,c}(i), \\ P_{RSRP-RS\_OFFSET,c}(m) + 10\log_{10}(M_{RSRP-RS,c}) + \\ P_{O\_PUSCH,c}(j) + \alpha_c(j) \cdot \tilde{P}L_c + f_c(i) \end{array}\right\}$$

[dBm]

The quantity $\tilde{P}L_c = f(PL_c(1), PL_c(2), \ldots)$ depends on the pathloss to multiple transceiver points. To ensure that the RSRP-RS can be received by all desired transceiver points, as long as the power is not limited by the maximum power, one could set $\tilde{P}L_c = \max(PL_c(1), PL_c(2), \ldots)$. However, this choice may lead to increased inter-cell interference. Other functions can be used as well, e.g. averaging or taking the x-th percentile pathloss.

To decouple RSRP-RS from one particular PUSCH one could combine $$P_{RSRP-RS\_OFFSET,c}(m) + P_{O\_PUSCH,c}(j) = P_{O\_RSRP-RS,c}(m, j)$$

into one new semi-statically configured parameter. It is possible that $P_{O\_RSRP-RS,c}(m,j)$ only depends on m or j but not on both.

It is furthermore possible to introduce a separate transmit power control (TPC) command targeting only RSRP-RS, i.e. the PUSCH TPC $f_c(i)$ would be replaced by a dedicated RSRP-RS TPC $\tilde{f}_c(i)$.

It is furthermore possible to combine multiple of the above disclosed subject matter. For example, the power control expression combining $P_{RSRP-RS\_OFFSET,c}(m) + P_{O\_PUSCH,c}(j)$ into one parameter, using RSRP-RS specific TPC commands and using $\tilde{PL}_c$ reads $$P_{RSRP-RS,c}(i) = \min\left\{ \begin{array}{l} P_{CMAX,c}(i), \\ P_{O\_RSRP-RS,c}(m, j) + 10\log_{10}(M_{RSRP-RS,c}) + \alpha_c(j) \cdot \tilde{PL}_c + \tilde{f}_c(i) \end{array} \right\}$$

[dBm]

A method of receiving reference signals on sub-carriers of a time frequency grid in the wireless network 1 comprises in a step S24 receiving a reference signal received power, RSRP, reference signal, RSRP-RS, sequence for uplink measurements from the wireless device 4. The RSRP-RS is received by the receiver 15 of the network node 2, 2a, 2b. As noted above, the RSRP-RS is mapped to every J:th sub-carrier, where J>2.

The I/O interface 13 of the network node 2, 2a, 2b is arranged to in a step S26 transmit a RSRP-RS report based on the RSRP-RS to a coordinating network node or a serving network node. In general terms, different RSRP-RS reports (providing relative path loss estimates between the transceiver points) may be combined by the coordinating network node for transceiver point selection.

As noted above the RSRP-RS is by the wireless device 4 transmitted according to a resource configuration. The transmitter 17 of the network node 2, 2a, 2b may therefore be arranged to, in a step S22, provide resource configuration for transmission of reference signals to the wireless device 4. The RSRP-RS may then by the wireless device 4 be transmitted according to this resource configuration. The step S22 may represent an initialization phase and thus be performed prior to step S24. However, the step S22 may also represent a reconfiguration phase and thus be performed after step S24.

The network may benefit from relative path loss estimates between the serving network node (say, network node 2a) and all neighbouring network nodes (say, as herein represented by the network node 2b). Assume that the wireless device 4 under consideration is located in cell "1". Assume also that the RSRP-RS resource configuration in the network 1 is set up as in step S22.

The serving network node 2a in cell "1" may then forward the RSRP-RS resource configurations to the network nodes 2b in all neighbouring cells. Thus, according to embodiments the I/O interface 13 of the network node 2, 2a may be arranged to, in a step S32, provide at least one further network node 2b with information regarding the resource configuration and/or an RSRP-RS report based on the absolute path loss value. Also the transmit power may be included in this report, since transmit power may be needed to estimate absolute path loss value. In principle, one network node could obtain information about the transmit power from the serving node and then forward another report with its own absolute path loss.

Likewise, in case the network node 2a is a coordinating network node, the I/O interface 13 of the network node 2, 2a may according to embodiments be arranged to, in a step S34, provide at least one network node 2b, with information relating to a semi-static configuration of the grid on which the RSRP-RS is to occur.

After all network nodes 2a, 2b have received the RSRP-RS from the wireless device 4 under consideration, the received powers of the RSRP-RS may be signalled to the serving network node 2a in cell "1" or to some other coordinating network node. Relative path loss estimates can then be calculated by the serving network node 2a or the other coordinating node. No extra signalling is needed to find the absolute path loss values, they are simply calculated by the serving network node 2a or the coordinating using the DL RSRP report from the wireless device as described below.

As noted above, a plurality of sub-carriers may not be used for transmitting the RSRP-RS. Such empty sub-carriers can be exploited in the network node 2a, 2b for noise measurements. According to embodiments the processing unit 12 of the network node 2a, 2b may thus be arranged to, in a step S36, measure noise based on a plurality of sub-carriers not being used for transmitting the RSRP-RS.

The RSRP-RS transmit power of a wireless device 4, that is needed to calculate absolute path loss values, is typically unknown at the network node. One straightforward way would be to signal the RSRP-RS transmit power of the wireless device 4, but according to the disclosed embodiment this extra signalling overhead is not required. Instead, the already existing DL RSRP report from a wireless device 4 to a given transceiver point may be used. Given this report and the received power of the RSRP-RS at this transceiver point, the network node is able estimate the RSRP-RS transmit power of the wireless device 4. According to embodiments the processing unit 12 of the network node 2a is arranged to, in a step S28, estimate the RSRP-RS transmit power of the wireless device 4 from the DL RSRP report of the wireless device 4 to a transceiver point and the received power of the RSRP-RS at this transceiver point.

This estimate of the absolute RSRP-RS transmit power can then be signalled to other transceiver points, networks, and/or network nodes and used for path loss estimation at transceiver points, networks, and/or network nodes not currently associated with the wireless device 4, that is, transceiver points to which the wireless device 4 does not transmit a DL RSRP report. According to embodiments the processing unit 12 of the network node 2a is arranged to, in a step S30, determine an absolute path loss value from the reported RSRP-RS transmit power and the RSRP-RS received power of any transceiver point receiving the RSRP-RS. For example, the RSRP-RS transmit power ($P_{RSRP-RS}$) of the wireless device 4 and the associated path loss (PL) to the transceiver point is given by $$RSRP_{RSRP-RS} = P_{RSRP-RS} \cdot PL$$

$$RSRP_{DL} = P_{DL} \cdot PL$$

$$P_{RSRP-RS} = P_{DL} \cdot \frac{RSRP_{RSRP-RS}}{RSRP_{DL}}$$

where $RSRP_{DL}$ and $P_{DL}$ are the DL reference signal received power and the transmit power of the DL reference signal, respectively. $RSRP_{RSRP\text{-}RS}$ denotes the received power of the proposed uplink reference signal.

The present disclosure has mainly been described above with reference to a few embodiments. However, as is readily appreciated by a person skilled in the art, other embodiments than the ones disclosed above are equally possible within the scope of the present disclosure, as defined by the appended patent claims. For example, the RSRP-RS may exploit a similar scheduling procedure as compared to SRS Type 0 or Type 1 in LTE; possibly, the same set of SRS base sequences, evaluated for the number of samples required for RSRP-RS, may be used. Differently from SRS, RSRP-RS is typically not provided with CS for multiplexing of different wireless devices 4. Time-domain averaging of the RSRP measurements is possible. Time-domain multiplexing of RSRP-RS transmissions is also possible, e.g. if the load is high and the number of users in a cell is larger than the comb factor or if it is desired to reduce the RSRP-RS inter-cell interference by using only a part of the available combs for each cell.

The invention claimed is:

1. A method of transmitting reference signals on sub-carriers of a time frequency grid in a wireless network, the method being performed by a wireless device, the method comprising:
obtaining resource configuration for transmission of reference signals;
transmitting a reference signal received power reference signal (RSRP-RS) sequence, according to said resource configuration, wherein said resource configuration determines the RSRP-RS sequence to be transmitted periodically or aperiodically, and wherein said resource configuration relates to a dynamic configuration of said time frequency grid on which the RSRP-RS sequence is to occur; and
determining an uplink transmit power for the RSRP-RS sequence based on downlink path loss estimates for at least two transceiver points by averaging path loss of the at least two transceiver points, wherein determining the uplink transmit power for the RSRP-RS sequence is further based on uplink absolute path loss estimates performed by a network node,
wherein the RSRP-RS sequence is mapped to every J:th sub-carrier, where J>2.

2. The method according to claim 1, wherein the RSRP-RS sequence is transmitted in a last symbol of a subframe.

3. The method according to claim 1, wherein other signals or channels scheduled in a same subframe as the RSRP-RS sequence are rate matched, punctured, or cancelled.

4. The method according to claim 1, wherein a plurality of sub-carriers are not used for transmitting the RSRP-RS sequence.

5. The method according to claim 1, wherein said sub-carriers selected for transmission of the RSRP-RS sequence are assigned according to a pseudo-random sequence, the method further comprising:
receiving initialization of the pseudo-random sequence from a network node.

6. The method according to claim 5, wherein the pseudo-random sequence is a function of time and relates to a shift of a starting carrier of the J:th sub-carrier.

7. The method according to claim 1, wherein said resource configuration further determines the RSRP-RS sequence to be transmitted upon request from a network node.

8. A method of receiving reference signals on sub-carriers of a time frequency grid in a wireless network, the method being performed by a network node, the method comprising:
providing resource configuration for transmission of reference signals to a wireless device;
receiving a reference signal received power reference signal (RSRP-RS) sequence, for uplink measurements from a wireless device, wherein the received RSRP-RS sequence is transmitted by the wireless device periodically or aperiodically, wherein said resource configuration relates to a dynamic configuration of said time frequency grid on which the RSRP-RS sequence is to occur, wherein the wireless device determines an uplink transmit power for the RSRP-RS sequence based on downlink path loss estimates for at least two transceiver points by averaging path loss of the at least two transceiver points, wherein the wireless device further determines the uplink transmit power for the RSRP-RS sequence based on uplink absolute path loss estimates performed by the network node, and wherein the RSRP-RS sequence is mapped to every J:th sub-carrier, where J>2; and
transmitting a RSRP-RS report based on said RSRP-RS sequence to a coordinating network node or a serving network node.

9. The method according to claim 8 wherein said received RSRP-RS sequence is, by said wireless device, transmitted according to said resource configuration.

10. The method according to claim 8, further comprising:
estimating the transmit power of the wireless device based on the RSRP-RS sequence relating to transmission from the wireless device to a transceiver point.

11. The method according to claim 10, further comprising:
determining an absolute path loss value based on said RSRP-RS sequence from the wireless device to said transceiver point.

12. The method according to claim 11, the method further comprising:
providing at least one further network node with information regarding said resource configuration and/or the RSRP-RS report based on the absolute path loss value.

13. The method according to claim 8, wherein the network node is a coordinating network node, the method further comprising:
providing at least one further network node, with information relating to a dynamic configuration of said time frequency grid on which the RSRP-RS sequence is to occur.

14. The method according to claim 8, further comprising:
measuring noise based on a plurality of sub-carriers not being used for transmitting the RSRP-RS sequence.

15. A wireless device for transmission of reference signals on sub-carriers of a time frequency grid in a wireless network, the wireless device comprising:
a receiver arranged to obtain resource configuration for transmission of reference signals;
a transmitter arranged to transmit a reference signal received power reference signal (RSRP-RS) sequence, according to said resource configuration, wherein said resource configuration determines the RSRP-RS sequence to be transmitted periodically or aperiodically, and wherein said resource configuration relates to a dynamic configuration of said time frequency grid on which the RSRP-RS sequence is to occur; and
a processing unit to determine an uplink transmit power for the RSRP-RS sequence based on downlink path loss estimates for at least two transceiver points by averaging path loss of the at least two transceiver points, wherein the processing unit further determines the uplink transmit power for the RSRP-RS sequence based on uplink absolute path loss estimates performed by a network node;

wherein the RSRP-RS sequence is mapped to every J:th sub-carrier, where J>2.

16. A wireless network for transmission and reception of reference signals on sub-carriers of a time frequency grid in the wireless network, comprising: at least one wireless device according to claim 15 that comprises the receiver arranged to obtain resource configuration for transmission of reference signals, the transmitter arranged to transmit the RSRP-RS sequence, according to said resource configuration, wherein said resource configuration determines the RSRP-RS sequence to be transmitted periodically or aperiodically, and wherein said resource configuration relates to the dynamic configuration of said time frequency grid on which the RSRP-RS sequence is to occur, and the processing unit to determine the uplink transmit power for the RSRP-RS sequence based on downlink path loss estimates for at least two transceiver points by averaging path loss of the at least two transceiver points, wherein the processing unit further determines the uplink transmit power for the RSRP-RS sequence based on uplink absolute path loss estimates performed by the network node; and at least one network node for reception of the RSRP-RS sequence, for uplink measurements from the wireless device, wherein the RSRP-RS sequence is mapped to every J:th sub-carrier, where J>2 on sub-carriers of the time frequency grid in the wireless network.

17. A network node for reception of reference signals on sub-carriers of a time frequency grid in a wireless network, comprising:

a transmitter arranged to provide resource configuration for transmission of reference signals to a wireless device; and a receiver arranged to receive a reference signal received power reference signal (RSRP-RS) sequence, for uplink measurements from the wireless device, wherein the received RSRP-RS sequence is transmitted by the wireless device periodically or aperiodically, wherein said resource configuration relates to a dynamic configuration of said time frequency grid on which the RSRP-RS sequence is to occur, wherein the wireless device determines an uplink transmit power for the RSRP-RS sequence based on downlink path loss estimates for at least two transceiver points by averaging path loss of the at least two transceiver points, wherein the wireless device further determines the uplink transmit power for the RSRP-RS sequence based on uplink absolute path loss estimates performed by the network node, and wherein the RSRP-RS sequence is mapped to every J:th sub-carrier, where J>2.

18. A non-transitory computer-readable medium storing a computer program for transmission of reference signals on sub-carriers of a time frequency grid in a wireless network, the computer program comprising computer program code which, when run on a wireless device, causes the wireless device to:

obtain resource configuration for transmission of reference signals;

transmit a reference signal received power reference signal (RSRP-RS) sequence, according to said resource configuration, wherein said resource configuration determines the RSRP-RS sequence to be transmitted periodically or aperiodically, and wherein said resource configuration relates to a dynamic configuration of said time frequency grid on which the RSRP-RS sequence is to occur; and determine an uplink transmit power for the RSRP-RS sequence based on downlink path loss estimates for at least two transceiver points by averaging path loss of the at least two transceiver points, and further determine the uplink transmit power for the RSRP-RS sequence based on uplink absolute path loss estimates performed by a network node, wherein the RSRP-RS sequence is mapped to every J:th sub-carrier, where J>2.

19. A computer program product comprising a computer program according to claim 18 and a non-transitory computer readable means on which the computer program is stored.

20. A non-transitory computer-readable medium storing a computer program for reception of reference signals on sub-carriers of a time frequency grid in a wireless network, the computer program comprising computer program code which, when run on a network node, causes the network node to:

transmit a resource configuration for transmission of reference signals to a wireless device; and receive a reference signal received power reference signal (RSRP-RS) sequence, for uplink measurements from the wireless device, wherein the received RSRP-RS sequence is transmitted by the wireless device periodically or aperiodically, wherein said resource configuration relates to a dynamic configuration of said time frequency grid on which the RSRP-RS sequence is to occur, wherein the wireless device determines an uplink transmit power for the RSRP-RS sequence based on downlink path loss estimates for at least two transceiver points by averaging path loss of the at least two transceiver points, wherein the wireless device further determines the uplink transmit power for the RSRP-RS sequence based on uplink absolute path loss estimates performed by the network node, and wherein the RSRP-RS sequence is mapped to every J:th sub-carrier, where J>2.

* * * * *